(12) United States Patent
McCaughan et al.

(10) Patent No.: US 7,515,801 B2
(45) Date of Patent: Apr. 7, 2009

(54) COHERENT TERAHERTZ RADIATION SOURCE

(75) Inventors: Leon McCaughan, Madison, WI (US); Chad Staus, Madison, WI (US); Thomas F. Kuech, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 3 days.

(21) Appl. No.: 11/617,475

(22) Filed: Dec. 28, 2006

(65) Prior Publication Data
US 2008/0159342 A1    Jul. 3, 2008

(51) Int. Cl.
*G02B 6/00* (2006.01)
(52) U.S. Cl. .................................. 385/122; 385/123
(58) Field of Classification Search .............. 385/122, 385/123
See application file for complete search history.

(56) References Cited

U.S. PATENT DOCUMENTS

| | | | |
|---|---|---|---|
| 6,815,683 | B2 | 11/2004 | Federici et al. |
| 6,856,746 | B2 | 2/2005 | Burrows et al. |
| 7,173,755 | B2 * | 2/2007 | Huang et al. ............... 359/332 |

OTHER PUBLICATIONS

Thompson, D.E., et al., "Step-Tunable Far Infrared Radiation by Phase Matched Mixing in Planar-Dielectric Waveguides," IEEE Transactions on Microwave Theory and Techniques, vol. MTT-22, No. 12, pp. 995-1000, Dec. 1974.

Eda, K., et al., "Novel Composite Piezoelectric Materials Using Direct Bonding Techniques," IEEE Ultrasonics Symposium, pp. 921-924, 1995.

Baldi, P., et al., "Nonlinear phase shift at 1.55 µm in CW single-pass waveguided cascaded parametric interactions," CLEO '99, pp. 380-381, 1999.

Chou, M.H., et al., "Multiple-channel wavelength conversion by use of engineered quasi-phase-matching structures in LiNbO3 waveguides," Opt. Lett. 24, pp. 1157-1159, 1999.

Avetisyan, Y., et al., "Analysis of THz-wave surface-emitted difference-frequency generation in periodically poled lithium niobate waveguide," Appl. Phys. B 73, pp. 511-514, 2001.

Suhara, T, et al., "Theoretical Analysis of Laterally Emitting Terahertz-Wave Generation by Difference-Frequency Generation in Channel Waveguides," IEEE Journal of Quantum Electronics, vol. 39, No. 1, Jan. 2003.

Shi, W., et al., "Designs of terahertz waveguides for efficient parametric terahertz generation," Applied Physics Letters, vol. 82, No. 25, pp. 4435-4437, Jun. 23, 2003.

(Continued)

*Primary Examiner*—Jennifer Doan
(74) *Attorney, Agent, or Firm*—Whyte Hirschboeck Dudek, S.C.

(57) ABSTRACT

A THz radiation source comprising a dual waveguide heterostructure is provided. The dual waveguide heterostructure includes an optical waveguide contained within a larger THz waveguide layered structure. The radiation source provides a coherent guided wave of THz radiation which is generated via difference frequency mixing in a gain medium with a large second-order nonlinearity and propagated with low THz loss by a dielectric medium in the layered waveguide structure. The THz radiation source is compact, has a high power output, and may be operated in continuous-wave (CW) mode at room temperature.

21 Claims, 2 Drawing Sheets

OTHER PUBLICATIONS

Mueller, Eric R., "Terahertz Radiation: Applications and Sources," The Industrial Physicist, pp. 27-29, published by American Institute of Physics, Aug./Sep. 2003.

Cao, H., et al., "Broadband generation of terahertz radiation in a waveguide," Optics Letters, vol. 29, No. 15, pp. 1751-1753, published by Optical Society of America, Aug. 1, 2004.

Ward, D.W., et al., "Terahertz wave generation and propagation in thin-film lithium niobate produced by crystal ion slicing," Applied Physics Letters 86, 022908, Jan. 6, 2005.

Wallace, V., "Terahertz methods show promise for breast cancer," Laser Focus World, www.laserfocusworld.com, pp. 83-85, Jun. 2006.

* cited by examiner

COHERENT TERAHERTZ RADIATION SOURCE

STATEMENT OF GOVERNMENT RIGHTS

This invention was made with United States government support awarded by the National Science Foundation (NSF) under grant numbers 0505775 and 0450509. The United States government has certain rights in this invention.

FIELD OF THE INVENTION

This invention pertains generally to coherent terahertz radiation sources. More specifically, this invention pertains to terahertz radiation sources having a dual waveguide structure that incorporates both an optical waveguide and a terahertz waveguide.

BACKGROUND OF THE INVENTION

Terahertz (THz) radiation is of great interest for imaging science and technology applications, with potentially great promise for homeland security, medical imaging, and defense imaging applications, among others. With their high sensitivity and selectivity, THz systems can be used to monitor public facilities, high-occupancy buildings, and even the open air for toxic industrial chemicals, chemical agents, biological agents, and trace explosives in a continuous and autonomous manner. Because of its superior penetration through many materials relative to other types of radiation, THz radiation is particularly well-suited for the detection and imaging of chemical and biological weapons concealed under clothing. In addition, wavelengths in the THz range may resonate with many biological molecules, including strands of DNA, in a unique manner. As a result, THz sources may also be used as sensors for the early detection of bioaerosols such as spores, bacteria, viruses, and pathogens. Unfortunately, the lack of sufficiently powerful, compact sources and detectors in the 0.3 to 30 THz range has drastically limited the development of THz sources for use in these fields.

The large second-order nonlinearities inherent in $LiNbO_3$ and its sister ferroelectrics, together with the ability to quasi-phase match pumps and products, make these materials ideal candidates for optically pumped terahertz generation via difference frequency mixing (DFM) or optical rectification (OR). The major drawback of these materials is that, unpumped, they absorb strongly ($\alpha \sim 25$ $cm^{-1}$) in the THz regime. As a consequence, conventional THz generation has been limited either to surface interactions by way of reflection or diffraction, or to bulk interactions through thin (~1 mm thick) samples.

SUMMARY OF THE INVENTION

This invention provides a THz radiation source comprising a dual waveguide heterostructure. The dual waveguide heterostructure includes an optical waveguide contained within a larger THz waveguide layered structure. The radiation source provides a coherent guided wave of THz radiation which is generated via difference frequency mixing in a gain medium with a large second-order nonlinearity and propagated with low THz loss by a dielectric medium in the layered waveguide structure. The THz radiation source is compact, has a high power output, and may be operated either in continuous-wave (CW) or pulsed mode at room temperature.

In its basic embodiment, the dual waveguide heterostructure includes both an optical waveguide and a THz waveguide. The THz waveguide is a layered structure that includes a thin layer of material having an inherent second-order nonlinearity, sandwiched between a first layer and a second layer of dielectric cladding material characterized by low absorption of THz radiation. An optical waveguide runs through the layer of nonlinear optic material along a direction parallel to the planes of the various layers in the heterostructure. Suitable materials for the nonlinear optic layer include ferroelectric metal oxides such as $LiNbO_3$, $LiTaO_3$, and $KNbO_3$; oriented (poled) polymers; and semiconductors such as GaAs. Suitable materials for the dielectric cladding include sapphire, quartz (crystalline silicon dioxide), silicon, amorphous silicon dioxide and polyethylene.

A guided wave of THz radiation may be generated by directing two guided optical pump beams at the proximal end of the optical channel waveguide to produce a guided THz beam via difference frequency mixing. Efficient difference frequency mixing requires that the two pump beams and the THz beam overlap strongly and are phase matched. In the present THz radiation sources, proper choice of the refractive indices and/or thicknesses of the dielectric cladding materials can be used to improve the optical field overlap of the optical pump beams and the THz product, as well as reducing phase mismatch. Phase matching may also be improved by use of periodic poling in the nonlinear optic material (i.e., periodically reversing the direction of the spontaneous polarization present in the nonlinear optic material.)

In one variation of the basic embodiment, the THz radiation source may be designed as a frequency-tunable radiation source. Frequency tunability requires that one of the two optical pump beams have a variable wavelength and that the phase matching requirement be met. By employing cladding layers having continuously adjustable refractive indices, continuous phase matching can be achieved. For example, continuous phase matching may be achieved if one or both of the dielectric layers in the dual waveguide heterostructure comprise a photonic crystal defined by a lattice of holes in the dielectric material. In this embodiment, the dielectric layer (or layers) may be rotated independently of the nonlinear optic layer around a longitudinal axis running perpendicular to the plane of the dielectric layer. In this design the photonic crystal provides an artificial dispersion which changes with its angular orientation relative to the optical pump beams. Therefore, by rotating the photonic crystal, a continuously changing propagation constant can be produced and adjusted to provide for phase matching over the frequency range of the variable wavelength optical pump beam. Other methods for providing frequency tunability include, but are not limited to, employing cladding layers with adjustable thicknesses and providing an airgap with an adjustable height between the nonlinear optic material and the dielectric material of one or both of the cladding layers.

Further objects, features, and advantages of the invention will be apparent from the following detailed description when taken in conjunction with the accompanying drawings.

DETAILED DESCRIPTION OF THE INVENTION

Figure 1:
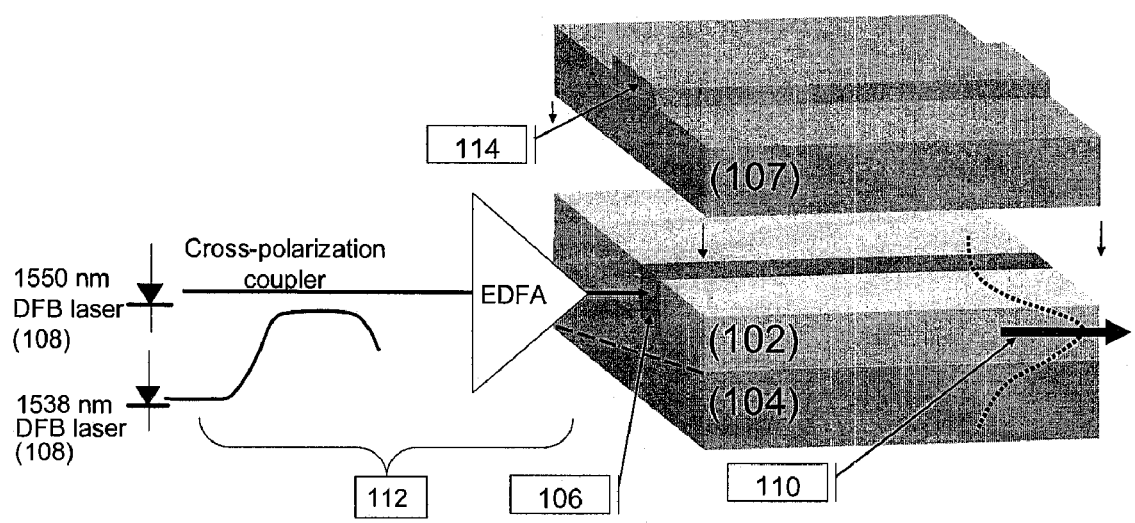
FIG. 1 is a schematic diagram of a partially exploded view of a dual waveguide heterostructure with a channel waveguide in the nonlinear optic material and a ridge waveguide in the cladding layer.

The present invention provides a THz radiation source comprising a dual waveguide heterostructure that includes an optically pumped channel waveguide surrounded by a transparent THz waveguide. The THz waveguide in the dual waveguide heterostructure is a layered structure that includes a thin layer of nonlinear optic material sandwiched between cladding layers comprised of dielectric material. The optical waveguide in the dual waveguide heterostructure is a channel waveguide defined within the nonlinear optic layer.

The nonlinear optic material in the dual waveguide structure is a thin layer of material having a large inherent second-order nonlinearity. Although it is desirable to choose materials with a relatively low absorption in the THz frequency range, many materials that have large second-order nonlinearities tend to absorb in the THz frequency range. Fortunately, the present dual waveguide structure helps mitigate THz losses due to absorption in the gain medium, as described in greater detail below. Nonetheless, the nonlinear optic layer desirably has an absorption of no more than about 50 $cm^{-1}$ at the THz wavelengths of interest. Examples of materials with large second-order non-linearities and sufficiently low absorption at THz wavelengths include, but are not limited to, ferroelectric metal oxides, such as $LiNbO_3$, $LiTaO_3$, and $KNbO_3$. In some preferred embodiments, the nonlinear optic material may be periodically poled to provide quasi-phase matching. A description of the use of periodic poling to achieve quasi-phase matching in $LiNbO_3$ may be found in Chou, et al., Opt. Lett., Vol. 24, pp. 1157-1159 (1999), the entire disclosure of which is incorporated herein by reference.

In the dual waveguide heterostructures, the nonlinear optic layer is disposed between cladding layers. The cladding layers comprise dielectric materials characterized by an index of refraction that is lower than the index of refraction of the nonlinear optic material. The cladding/nonlinear optic/cladding heterostructure creates a waveguide along the direction perpendicular to the planes of the layers in the heterostructure, preventing the THz product from spreading (diffracting) too far into the substrate. In some preferred embodiments, the cladding layers have a refractive index at THz frequencies that is approximately equal to that of the optical pump index of refraction. By way of illustration, if $LiNbO_3$ is used as the gain medium of the nonlinear optic layer, the cladding layers are desirably composed of a dielectric material having an index of refraction no greater than about 2.5 at a wavelength of 1.5 THz. Suitable materials for cladding layers employed with $LiNbO_3$ include quartz, silicon dioxide, and polyethylene. Other cladding materials which may be used with other nonlinear optical materials (e.g., GaAs) include silicon and sapphire.

The dielectric materials of the cladding layers not only have a lower index of refraction in the THz regime than the nonlinear optic layer, but also have a lower absorption at THz wavelengths. Thus, the cladding layers provide a waveguide structure for the THz radiation with significantly lower loss than a waveguide design based on bulk nonlinear optic materials. In addition, the thickness of the cladding layers may be optimized to minimize or eliminate phase mismatch between the pump beams and the THz beam. Typically, optimal thicknesses for the cladding layers are from about 1 µm to about 100 µm.

When properly phase matched, two pump beams coupled to the optical waveguide will produce a guided mode (typically, but not necessarily, the fundamental mode) at THz frequencies via difference frequency mixing. Once produced, the THz beam is propagated by the larger THz waveguide with low THz loss. The dual waveguide heterostructure design may be tailored to ensure that the optical pump beams and the resulting THz product remain confined, overlap strongly, and are phase matched. As a result, the present structures are able to achieve a net gain at significantly lower pump powers than bulk material-based devices and provide for an increased interaction length for the optical pump beams. This last point is important, since the conversion efficiency of the device scales with the length of the heterostructure squared. The net result is a THz source with a power conversion efficiency comparable to or better than other methods of THz production (e.g., the quantum cascade laser or photomixing) and which is several orders of magnitude larger than difference frequency mixing in bulk materials.

Depending on the choice of nonlinear optical materials used, the present THz radiation sources may be designed to provide radiation over a range of THz frequencies (e.g., about 0.3 to about 10 THz). For example, an $LiNbO_3$ THz source may be designed to produce an average THz power at 1.5 THz of 1.6 µW for a pair of 1 W optical pump beams at 1.5 µm and a device length of 10 mm. This equates to a conversion efficiency of $8\times10^{-7}$ (or a normalized efficiency of $3.75\times10^{-3}$ $W^{-1}\,cm^{-2}$).

Suitable methods for fabricating and assembling the various components of the present coherent THz radiation sources are described in the following paragraphs.

Thin layers of the nonlinear optic material may be produced by starting with a bulk material and mechanically reducing the thickness using any suitable means, including lapping. For example, methods for thinning an $LiNbO_3$ substrate using mechanical polishing are described by Wu et al. in the Japanese Journal of Applied Physics, Vol. 45, No. 4B, 2006, pp. 3822-3827; by Nishida et al. in "0-dB Wavelength Conversion Using Direct-Bonded, QPM-Zn: $LiNbO_3$ Ridge Waveguide," IEEE Photonics Technology Letters, Vol. 17, No. 5, May 2005, 1049; and by Eda et al. in "Novel Composite Piezoelectric Materials Using Direct Bonding Techniques," IEEE Ultrasonics Symposium, Seattle, Wash., Vol. 2, pp. 921-924, 7-10 Nov. 1995; the entire disclosures of which are incorporated herein by reference. Alternatively, a layer of the nonlinear optic material having the desired thickness may be deposited onto an underlying substrate. A process for forming thin films of metal oxides, including thin films of $LiNbO_3$, is described in U.S. Pat. No. 6,846,428, the entire disclosure of which is incorporated herein by reference. Briefly, this process includes the steps of growing an amorphous film of lithium niobate on a substrate surface using chemical vapor deposition and annealing the deposited lithium niobate film for a time and at a temperature sufficient to convert the film from an amorphous to a crystalline form.

The conversion efficiency of the THz radiation source will increase as the phase match between the two pump beams and the generated THz beam improves and as the loss at THz frequencies due to absorption by the nonlinear optic material decreases. In the present devices, conversion efficiency is optimized by employing a thin nonlinear optic layer. Typically, the nonlinear optic layer has a thickness of no greater than about 100 µm. This includes nonlinear optic layers having a thickness of no greater than 50 µm and further includes nonlinear optic layers having a thickness of no greater than 10 µm. For example, if the nonlinear optic layer comprises a layer of crystalline $LiNbO_3$, the layer desirably has a thickness from about 4 µm (at about 3 THz) to about 30 µm (at about 0.6 THz).

Once the nonlinear optic crystalline layer has been fabricated, an index channel waveguide may be fabricated into the nonlinear optic layer using, for example, in-diffusion or proton exchange. For example, in the case of a LiNbO$_3$ nonlinear optic layer, an optical waveguide channel may be fabricated into the LiNbO$_3$ crystal using titanium (Ti) in-diffusion or proton exchange. A description of a method for forming an in-diffused titanium waveguide in lithium niobate may be found in U.S. Pat. No. 6,856,746, the entire disclosure of which is incorporated herein by reference. Optionally, the nonlinear optic layer may include a ridge waveguide to provide confinement of the THz product along the direction parallel to the planes in the heterostructure. This ridge waveguide may be fabricated by defining a ridge in the upper or lower surface of the nonlinear optic material layer above or below the optical channel waveguide. Alternatively, the ridge may be built into a cladding layer as shown in FIGS. 1-3, which are described in greater detail below.

The nonlinear optic layer may be disposed between dielectric cladding layers by growing a film of the nonlinear optic material on a first dielectric substrate and subsequently wafer-bonding the film to a second dielectric substrate to create a sandwich structure. Alternatively, a layer of the nonlinear optic material may be wafer-bonded to the first dielectric substrate and mechanically thinned, followed by wafer-bonding of the thinned nonlinear optic layer to the second dielectric substrate.

Figure 2:
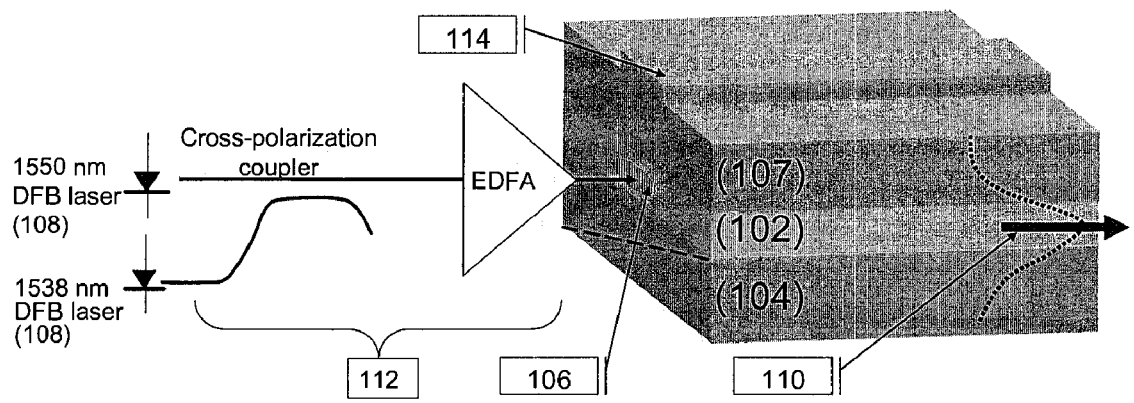
FIG. 2 is a schematic diagram of the assembled dual waveguide heterostructure of FIG. 1, showing the profile of the resulting optical channel waveguide.
Figure 3:
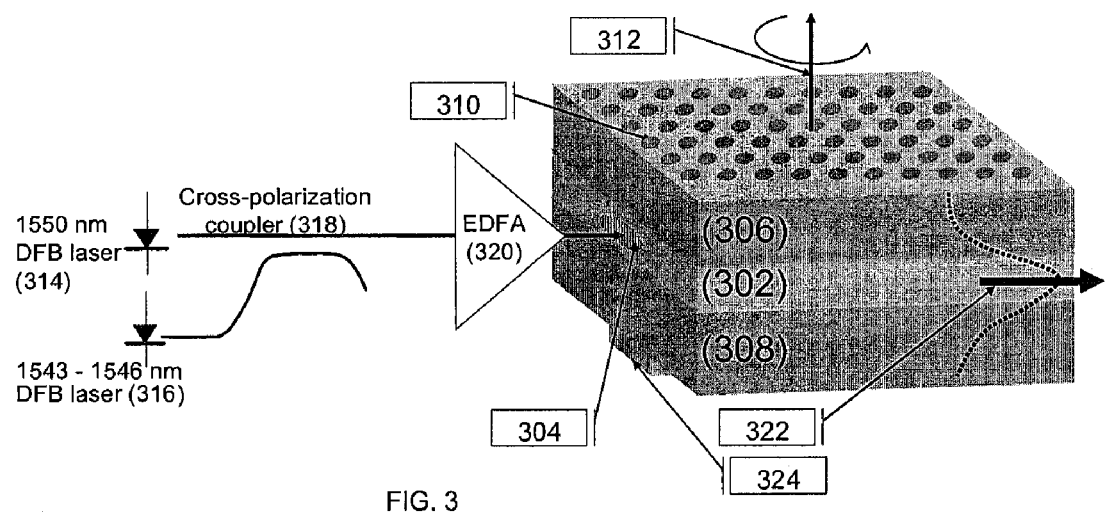
FIG. 3 is a schematic diagram of a tunable dual waveguide heterostructure with a ridge waveguide and a rotatable photonic crystal in one cladding layer.

In order to more fully illustrate the invention, a specific example of the structure and operation of a THz radiation source based on an LiNbO$_3$ nonlinear optic layer is shown in FIG. 1 (exploded view) and FIG. 2 (assembled view). The heterostructure 100 includes a thin film of gain medium 102 comprising a ~9 μm-thick film of LiNbO$_3$ on a 0.5 mm-thick crystalline SiO$_2$ (quartz) substrate 104. An index channel waveguide 106 is formed in the LiNbO$_3$ film by in-diffusion of a 90 nm×9 μm strip of Ti to provide a Ti:LiNbO$_3$ waveguide. A second quartz substrate 107 is then wafer-bonded to the LiNbO$_3$ film to form a symmetrical structure. Two distributed feedback (DFB) diode lasers 108 are coupled to the optical waveguide by way of a fiber optic coupler and an erbium-doped optical amplifier (EDFA) 112. When properly phase-matched, two optical pump beams (e.g., 1550 nm and 1538 nm) from the DFB diode lasers launched into the Ti:LiNbO$_3$ waveguide will produce a fundamental guided mode at 1.5 THz 110 by difference frequency mixing. The quartz provides a waveguide structure with significantly lower loss ($\alpha_{quartz}$~0.1 cm$^{-1}$) than LiNbO$_3$ ($\alpha_{LiNbO3}$~32 cm$^{-1}$). The lower loss quartz cladding layers and the LiNbO$_3$ nonlinear optic layer carry the THz beam generated in the LiNbO$_3$ layer. Confinement of the THz product along the direction parallel to the layered planes in the heterostructure is provided by a ridge waveguide 114 formed in upper cladding layer 107. The ridge in this embodiment is ~1-2 μm deep and ~20-100 μm wide. This configuration provides a greater interaction length for the pump beams than current designs using bulk LiNbO$_3$, greatly increasing conversion efficiency and power output. For example, the present heterostructures, including the heterostructure shown in FIGS. 1 and 2 may have a length of at least about 1 cm, or even at least about 2 cm.

The nonlinear optical guiding layer of the heterostructure can be produced by wafer bonding a layer of bulk LiNbO$_3$ to the underlying substrate, followed by a mechanical thinning step (e.g., lapping). Alternatively, the LiNbO$_3$ layer may be deposited on the cladding substrate using a variety of chemical or mechanical techniques, including chemical vapor deposition (CVD) or sputtering. In the latter case, CVD can be used to deposit an amorphous film of LiNbO$_3$ on Al$_2$O$_3$. While the amorphous form does not have nonlinear optical properties, it can be easily patterned using standard photolithographic techniques followed by etching using etchants such as 10% HF. Further, subsequent annealing of the film at about 900° C. for about 1 hour converts the amorphous layer to a crystalline film with the nonlinear properties of bulk LiNbO$_3$. In the illustrative embodiment described here, the resulting LiNbO$_3$ material may be formed with its crystal axis perpendicular to the substrate. The ability to select nonlinear optic materials with particular crystal structures is advantageous because both the refractive indices and the nonlinear optical properties of the THz generation layer change with the orientation of the crystalline material. Thus, proper choice of crystal orientation may be used to improve phase matching in the device.

A 2D calculation of the difference frequency mixing between two guided wave optical beams at ~1.55 μm to produce a guided wave at 1.5 THz was conducted for the structure shown in FIG. 1. An index channel waveguide was formed in the LiNbO$_3$ film by in-diffusion of a 90 nm×9 μm strip of Ti to provide a Ti:LiNbO$_3$ waveguide for the pump beams. The THz waveguide was formed by a ridge structure (15 μm wide, 2 μm ridge height) in the LiNbO$_3$ film surrounded by quartz cladding layers. The calculations were conducted using the beam propagation method with commercially available software (Rsoft BeamPROP™) to find the electric field profiles and propagation constants of the two pumps and the THz in the guiding structure. The calculations accounted for phase mismatch and loss at THz frequencies due to absorption by the guiding structure. The pump powers were each 500 mW. A thickness of approximately 9 μm was found to produce phase matching in this system. The calculation further found that the heterostructure had an optimum length of about 20 mm and that longer lengths do not produce additional THz radiation. The calculated output power at a frequency of 1.5 THz ($\lambda$=200 μm) using pump wavelengths of $\lambda_{p1}$=1538.1 nm and $\lambda_{p2}$=1550.0 nm, a 9 μm thick LiNbO$_3$ layer, and a length of 20 mm was found to be 0.8 μW. The phase-matched THz frequency can be adjusted by proper choice of the thickness of the LiNbO$_3$ and quartz layers in the THz waveguide. Periodic poling (periodically reversing the direction of the spontaneous polarization present in the nonlinear optic material) could also be used to satisfy phase matching. In addition, periodic poling introduces another degree of freedom into the phase matching process, thereby allowing the user to use other cladding materials such as Si and Al$_2$O$_3$ which would otherwise not meet phase-matching conditions.

Optionally, the dual waveguide heterostructures may be made into tunable THz radiation sources by employing cladding layers with a continuously adjustable index of refraction (or equivalently, a continuously adjustable propagation constant for the THz radiation) and, therefore, the capability of continuous phase matching. For example, a frequency tunable radiation source may be made by incorporating an independently-rotating photonic crystal into at least one cladding layer. In such embodiments, one of the optical pumps has a variable wavelength, and phase matching between the two optical pump beams and the generated THz wave is achieved by rotating the photonic crystal relative to the nonlinear optic layer as the wavelength of the variable wavelength optical pump wave changes. The photonic crystal provides an artificial dispersion which changes with the angular orientation relative to the optical pump beams. (See, for example, *Photonic Crystals*, J. D. Joannopoulos, Chapter 4, the entire disclosure of which is incorporated herein by reference.) Thus, by rotating the photonic crystal, a continuously changing propagation constant of the THz mode can be produced and adjusted to provide for phase matching over the frequency range of the variable wavelength pump beam. Notably, the photonic crystal in this embodiment of the invention does not make use of a defect in the photonic bandgap, as do conventional optical photonic structures.

The photonic crystals may be defined by a lattice of holes (e.g., a square lattice or a hexagonal lattice) in a cladding layer. The lattice structure need not extend all the way through the cladding layer. Rather, the lattice structure may extend only partially through the cladding layer from the surface of the cladding layer adjacent to the nonlinear optic layer, since this is the region of the device that will most strongly overlap the THz field. Hole diameter is typically from ¼ to ¾ of the lattice spacing. Lattice spacing periodicity for THz generation typically will be in the range of about 25 μm to about 100 μm.

A tunable THz radiation source is shown schematically in FIG. 3. Like the heterostructure of FIGS. 1 and 2, the heterostructure shown in FIG. 3 includes an LiNbO$_3$ nonlinear optic layer 302 with a Ti:LiNbO$_3$ index channel waveguide 304 sandwiched between quartz cladding layers 306, 308. A photonic crystal is defined in the upper cladding layer 306 by a lattice of holes 310. The holes may be etched into the cladding layer using conventional lithography techniques. For a 1.5 THz beam, a two-dimensional square lattice with holes having a periodicity of about 50 μm and diameters of about 20 μm may be employed. The upper cladding layer may be rotated independently of the nonlinear optic layer about an axis 312 running perpendicular to the plane of the cladding layer in order to provide continuous phase matching. In the present embodiment, the device is used to provide a tunable THz frequency generator by pumping the Ti:LiNbO$_3$ with a fixed wavelength (1550 nm) pump beam 314 and a variable wavelength (1530-1630 nm) pump beam 316 (passed through a cross-polarization coupler 318 and an erbium doped filter amplifier (EDFA) 320). A THz beam 322 is generated in the LiNbO$_3$ gain medium and carried by the layered THz waveguide. A ridge waveguide 324 provides confinement of the THz product along the direction parallel to the layered planes in the heterostructure. As the output frequency of the variable wavelength pump is changed, the upper cladding layer rotates to provide for continuous phase matching in the system.

Continuous phase matching may be provided by methods other than the use of a rotating photonic crystal. As examples, a small (e.g., ~0.5-20 μm) airgap with an adjustable height between the nonlinear optic layer and the dielectric material of one or both of the cladding layers will produce a large change in the effective refractive index of the structure as function of airgap height, significantly altering the degree of phase mismatch. The height of the airgap can be electrically adjusted using a standard piezoelectrically-driven translator. Another method to adjust the effective refractive index of the structure is to split one (or both) of the cladding layers diagonally into two wedges. (See dashed line in FIG. 2.) The cladding layer thickness then can be changed by sliding one wedge along the other along the interface where the two wedges meet. The overall thickness of this cladding layer could be adjustable from about 10 μm to about 50 μm.

For the purposes of this disclosure, and unless otherwise specified, "a" or "an" means "one or more." All patents, applications, references, and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is understood that the invention is not confined to the particular embodiments set forth herein as illustrative, but embraces all such modified forms thereof as come within the scope of the following claims.

What is claimed is:

1. A dual waveguide heterostructure, comprising:
   (a) a terahertz (THz) waveguide comprising:
      (i) a nonlinear optic layer comprising a nonlinear optic material having an inherent second-order non-linearity;
      (ii) a first cladding layer comprising a dielectric material; and
      (iii) a second cladding layer comprising a dielectric material, wherein the first and second cladding layers sandwich the nonlinear optic layer; and
   (b) an optical waveguide contained in the THz waveguide.

2. The heterostructure of claim 1, wherein the nonlinear optic layer comprises LiNbO$_3$.

3. The heterostructure of claim 2, wherein the dielectric materials of the first and second cladding layers have an index of refraction in the THz regime of no greater than 5 at a wavelength of 1.5 THz.

4. The heterostructure of claim 2, wherein the dielectric materials of at least one of the first and second cladding layers is quartz.

5. The heterostructure of claim 2, wherein the LiNbO$_3$ is periodically poled.

6. The heterostructure of claim 5, wherein the dielectric materials of the first and second cladding layers are selected from the group consisting of sapphire, polyethylene, silicon dioxide, and silicon.

7. The heterostructure of claim 2, wherein the optical waveguide is a Ti:LiNbO$_3$ channel waveguide.

8. A dual waveguide heterostructure, comprising:
   (a) a terahertz (THz) waveguide comprising:
      (i) a nonlinear optic layer comprising a nonlinear optic material having an inherent second-order non-linearity;
      (ii) a first cladding layer comprising a dielectric material;
      (iii) a second cladding layer comprising a dielectric material, wherein the first and second cladding layers sandwich the nonlinear optic layer; and
   (b) an optical waveguide contained in the THz waveguide, wherein an upper or lower surface of at least one of the first and second cladding layers defines a ridge.

9. The heterostructure of claim 1, wherein an upper or lower surface of the nonlinear optic layer defines a ridge.

10. A dual waveguide heterostructure, comprising:
   (a) a terahertz (THz) waveguide comprising:
      (i) a nonlinear optic layer comprising a nonlinear optic material having an inherent second-order non-linearity;
      (ii) a first cladding layer comprising a dielectric material;

(iii) a second cladding layer comprising a dielectric material, wherein the first and second cladding layers sandwich the nonlinear optic layer; and (b) an optical waveguide contained in the THz waveguide, wherein one or both of the first and second cladding layers comprises a photonic crystal defined by a lattice of holes in the dielectric material.

11. The heterostructure of claim 1, wherein the nonlinear optic layer comprises $LiTaO_3$ or $KNbO_3$.

12. A dual waveguide heterostructure, comprising:
(a) a terahertz (THz) waveguide comprising:
(i) a nonlinear optic layer comprising a nonlinear optic material having an inherent second-order non-linearity;
(ii) a first cladding layer comprising a dielectric material; and
(iii) a second cladding layer comprising a dielectric material, wherein the first and second cladding layers sandwich the nonlinear optic layer; and
(b) an optical waveguide contained in the THz waveguide, wherein at least one of the cladding layers has a continuously adjustable propagation constant for a THz mode.

13. The heterostructure of claim 12, wherein at least one of the first and second cladding layers comprises a photonic crystal defined by a lattice of holes in the dielectric material, and further wherein the cladding layer comprising the photonic crystal may be rotated independently of the nonlinear optic layer to provide the continuously adjustable propagation constant for the THz mode.

14. The heterostructure of claim 12, wherein at least one of the first and second cladding layers comprises an airgap between the dielectric material of the cladding layer and the nonlinear optic material, and further wherein the height of the airgap may be adjusted to provide the continuously adjustable propagation constant for the THz mode.

15. The heterostructure of claim 12, wherein at least one of the first and second cladding layers comprises two wedges in contact along an interface, and further wherein sliding one of the two wedges along the interface changes the thickness of the cladding layer to provide the continuously adjustable propagation constant for the THz mode.

16. A method for generating THz radiation using a heterostructure comprising,
(a) a terahertz (THz) waveguide comprising:
(i) a nonlinear optic layer comprising a nonlinear optic material having an inherent second-order non-linearity;
(ii) a first cladding layer comprising a dielectric material;
(iii) a second cladding layer comprising a dielectric material, wherein the first and second cladding layers sandwich the nonlinear optic layer; and
(b) an optical waveguide contained in the THz waveguide, the method comprising directing two optical pump beams at a proximal end of the optical waveguide to produce a guided wave via difference frequency mixing.

17. The method of claim 16, wherein the guided wave has a frequency of at least 0.3 THz.

18. The method of claim 17, wherein the guided wave has a power of at least 2 nW.

19. The method of claim 16, wherein the guided wave is generated under room temperature operation.

20. A method for generating THz radiation using the heterostructure of claim 12, the method comprising directing two optical pump beams at the proximal end of the optical waveguide to produce a guided wave via difference frequency mixing.

21. The method of claim 20, further comprising varying the wavelength of one of the optical pump beams and adjusting the propagation constant for the THz mode in the at least one cladding layer.

* * * * *